March 16, 1954  J. G. REES  2,672,602
APPARATUS FOR MEASURING RATE OF FLOW OF FLUID
Filed Sept. 28, 1950
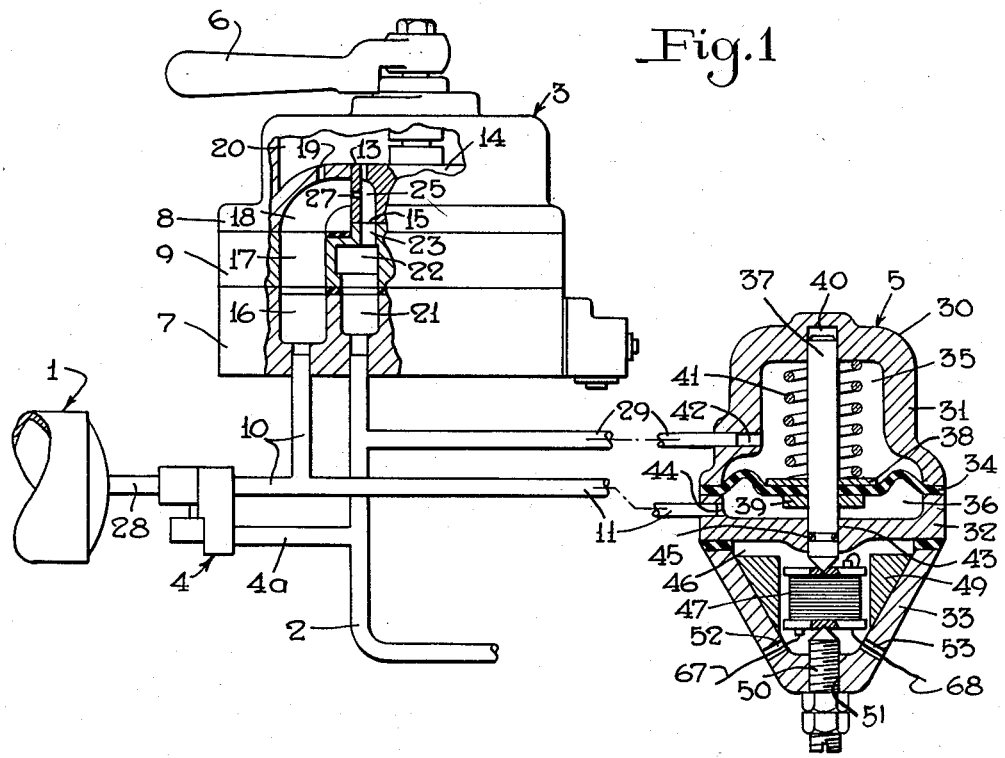
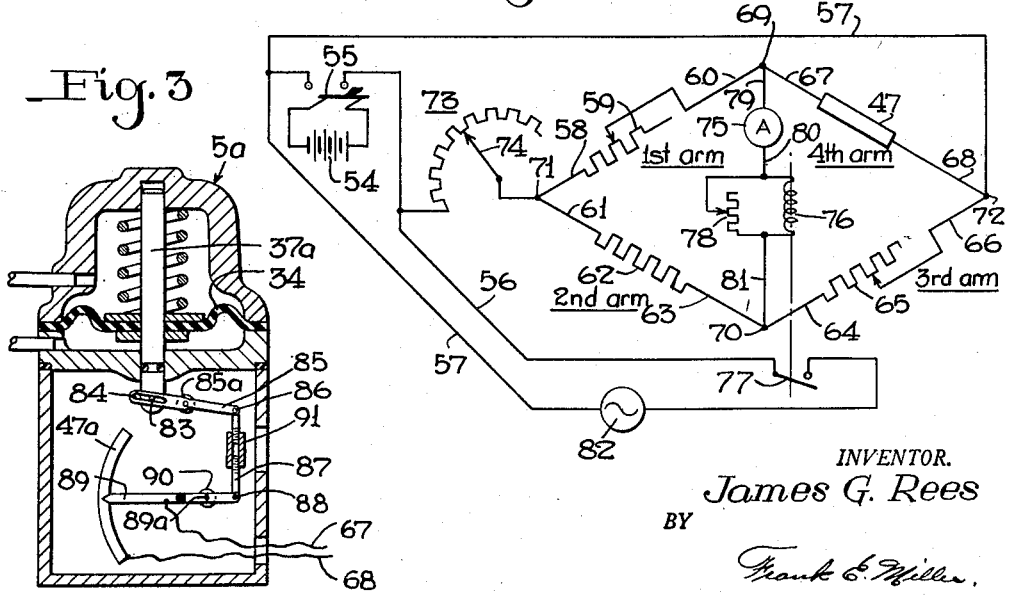
INVENTOR.
James G. Rees
BY
Frank E. Miller,
ATTORNEY Patented Mar. 16, 1954

2,672,602

UNITED STATES PATENT OFFICE 2,672,602

APPARATUS FOR MEASURING RATE OF FLOW OF FLUID

James G. Rees, Chicago, Ill., assignor to Westinghouse Air Brake Company, a corporation of Pennsylvania Application September 28, 1950, Serial No. 187,334

2 Claims. (Cl. 340—242)

This invention relates to fluid pressure brakes of the type employed on railroad trains and more particularly to indicating means for use on the power car or locomotive for constantly informing the operator of the condition of the brake pipe and brake equipment throughout the train with respect to pressure of fluid therein, or leakage of fluid therefrom, so that he may be governed accordingly in controlling the brakes on the train to better insure safety thereof.

The means used at present on a railway train to indicate to the operator the pressure condition of the brake pipe and associated pneumatic equipments of the train, is a pressure gauge located on the locomotive and connected to the brake pipe at the locomotive. However, the indication given by this gauge is not always accurate as to the true pressure in the brake pipe and brake equipments throughout the train, but only at the locomotive or front of the train since the brake pipe is charged by fluid under pressure at the locomotive and thus the brake pipe pressure will usually be lower towards the middle and rear of the train by a degree depending upon the amount of leakage of fluid under pressure from the brake pipe. This is more evident with the brake equipment employed on modern locomotives having high capacity feed valves and brake valve devices for charging the brake pipe, since with such equipment the brake pipe gauge on the locomotive may indicate that the brake pipe is fully charged when actually, the pressure of fluid in the brake pipe, towards the rear end of the train, may be much lower due to brake pipe leakage throughout the train.

If the engineer or operator is led to believe by the indication of the pressure gauge that the brake system on the train is fully charged when actually a full charge exists in the brake pipe only adjacent the front end of a train and a low charge exists towards the rear of the train, it is possible that when he operates the brake valve device to effect a brake application, which operation cuts off the supply of fluid under pressure to the brake pipe, an excessive service application may result at the front end of the train due to the tendency of the brake pipe pressure at the front to equalize with the lower brake pipe pressure at the rear of the train thereby causing a damaging run-in of slack in the train. It is also possible, that if the brake pipe gradient, that is, the difference in pressure in the brake pipe at the front end and rear of a train, is great enough, an intended service application may not only become an excessive service application but the reduction in brake pipe pressure at the head of the train, due to the flow of fluid toward the rear of the train, may occur at an emergency rate and result in an undesired emergency application of the brakes throughout the train and possible damage to or derailment of cars.

In the cycling of train brakes during descent of a grade, the engineer cannot fully rely on the indication given by the pressure gauge, not only for the reasons given in the previous paragraph, but there also exists a possibility he may misjudge recharging operations of the train to an extent that adequate control of the train can no longer be maintained and the train may run away. This can be understood with an explanation of the customary brake cycling process which is to alternately apply the brakes and then recharge the train brake system during which time the brakes throughout the train will partially release. If the recharge between brake applications is sufficient to provide adequate reapplication of the brakes throughout the train, the train safety is assured, but if inadequate, as may occur particularly in case of excessive leakage of the train brake system, the pressure of fluid in the brake equipments toward the rear of the train may gradually get lower and lower, until eventually it may become so low as to be insufficient to effect a brake application. If the engineer is aware of such a condition developing he may effect an emergency application of the brakes to bring the train to a stop and then, by holding the train stopped with the locomotive brakes, recharge the brake system so as to be able to proceed with safety. Otherwise the train may run away. During such cycling operation the pressure gauge at the locomotive may indicate full brake pipe pressure in the brake pipe and brake equipment during recharging operation while actually the pressure in the brake system to the rear of the locomotive may be decreasing as above mentioned.

Another need for indicating the true pressure condition of the brake pipe and associated pneumatic equipments throughout the train is necessitated because of the combination of the very great traction forces available on modern locomotives and the high capacity feed valves and brake valve devices used to charge the brake system of the train. If the conductor of a train operates the usual well-known conductor's valve device at the rear end of the train to cause a service application of the brakes, the engineer may never notice what is occurring. He may only note a slight drag or slowing down of the train and since the brake pipe gauge on the locomotive may still indicate a full charge in the brake pipe, he may, in order to maintain his speed, increase the output of tractive force of the locomotive not knowing that the brake application has been initiated. As can be seen, this may result in a sliding and flattening of the wheels of the rear end cars which may result in a derailment, or an accidental brake-in-two of the train may result causing an emergency application of brakes throughout the train. Even in the case of accidental break-in-two of a train, and hence of the brake pipe, the feed valve device may rebuild brake pipe pressure at the locomotive so quickly as to cause the brake pipe gauge to indicate full pressure without the engineer knowing what is taking place at the rear of the train and therefore he may attempt to continue with the tractive force of the locomotive.

The principal object of my invention is therefore to provide improved means for supplying the engineer of a train with a constant accurate indication of the true condition of the brake pipe and brake equipments throughout the train with respect to pressure of fluid therein and leakage of fluid under pressure therefrom.

It is another object of my invention to provide means for supplying the engineer with an indication of a reduction in pressure in the brake pipe initiated remote from the locomotive, as by operation of the conductor's valve at the rear of a train, so that he may promptly act accordingly.

Another object of my invention is to provide means for immediately informing the engineer of a break-in-two of the train in order that he may promptly cut off the power to the locomotive and take other necessary action to prevent damage to the train.

The above objects, together with other objects which will be made apparent in the subsequent description of my invention, are obtained by apparatus to be hereinafter described when taken in connection with the accompanying drawings which disclose the invention in use with a D-24 brake valve and a D-24 feed valve, both of which are well-known.

Fig. 1 of the accompanying drawings is a diagrammatic view, partly in outline and partly in section, of certain elements of a modern locomotive brake equipment embodying the invention and including an engineer's automatic brake valve device which is shown in running position. Fig. 2 is a diagrammatic view illustrating an electric circuit forming part of the invention; and Fig. 3 is a modification of the invention.

*Description Figs. 1 and 2*

The elements of the locomotive brake control equipment shown in Fig. 1 of the drawing are such as used on modern locomotives and may include a main reservoir 1 for receiving and storing fluid under pressure for use in controlling the brakes on the locomotive and cars of a train, the usual brake pipe 2 which extends throughout the length of the train, a brake valve device 3 of the usual large capacity type for controlling the delivery of fluid under pressure from said main reservoir to said brake pipe and for also controlling the venting of fluid under pressure from said brake pipe to atmosphere, a feed valve device 4 for limiting, to a predetermined reduced pressure, the pressure of the fluid delivered therefrom to said brake pipe from said main reservoir and, according to the invention, may also include a pressure measuring device hereinafter referred to as the measuring device 5, for measuring the difference between the pressure of fluid in said brake pipe and the pressure of fluid delivered by said feed valve device.

The brake valve device 3 may be the same as fully disclosed in Patent No. 2,314,397 issued March 23, 1943 to Ellis E. Hewitt. Briefly, the brake valve device comprises a pipe bracket 7, a cover 8, and an intermediate section 9 which are mounted one on top of the other in the order shown in the drawing and rigidly secured in this relation in the usual manner. To the pipe bracket 7 are connected the brake pipe 2 and the feed valve pipe 10 with branch pipe 11, the pipe 10 being also connected to the feed valve device 4.

The cover section 8 of the brake valve device 3 has a bore 13 in which is located a rotary valve 14 which has a neat turning fit in said bore. The face of the rotary valve seats in the usual manner on a seat 15 provided on section 9. The rotary valve 14 is connected to a handle 6 in the usual manner such that turning of said handle will cause the rotary valve to rotate on the seat 15 to its different well-known brake controlling positions, said handle and valve being shown in the drawing in the usual running position in which it is normally carried during running of a train and which is the only position pertinent to the invention.

The feed valve pipe 10 is connected through passages 16 and 17 in pipe bracket 7 and brake valve section 9, respectively, to a passage 18 in the brake valve cover 8. A passage 19 in brake valve cover 8 connects passage 18 to a rotary valve chamber 20 on top of the rotary valve 14.

The brake pipe 2 is connected to the rotary valve seat 15 through a passage 21 in pipe bracket 7, a passage 22 in the section 9 and a passage 23 which opens at said seat, the rotary valve 14 having a cavity 25 registering with passage 23, and a restricted port 27 registering with passage 18 in the running position of said valve. The brake pipe 2 is also connected to the feed valve device 4 by the pipe 4a. Fluid under pressure supplied to this pipe 4a from the brake pipe 2 acts on the feed valve device 4 to cause this device to function to regulate the delivery of fluid under pressure from the main reservoir to the brake pipe by way of port 27 and cavity 25 in the rotary valve of the brake valve device in the usual well-known manner.

The feed valve device 4 is of the large capacity type used in modern locomotives and such as shown in Patent No. 2,424,480, issued July 22, 1947, to Glenn T. McClure. Since this feed valve device is commonly known, a detailed explanation thereof is unnecessary. The feed valve device 4 is connected to the main reservoir by a pipe 28 and according to regulation as is effected by pressure of fluid in the regulating pipe 4a, delivers fluid at a predetermined reduced pressure to the brake valve device 3 by way of pipe 10 and to the measuring device 5 by way of pipes 10 and 11. The measuring device 5 is also connected to the brake pipe 2 by way of a pipe 29 and, according to the invention, is also connected by wires 67 and 68 to a Wheatstone bridge circuit, to be described hereinafter.

This measuring device 5 comprises a casing 30 which is divided into three sections, section 31, section 32, and section 33. Sections 31 and 32 are separated by a flexible diaphragm 34 thereby defining at opposite sides of said diaphragm two separate chambers 35 and 36. A diaphragm plunger 37, extending through the center of diaphragm 34, is securely attached thereto by pressure sealing plates 38 and 39. The chamber 35 contains the upper portion of plunger 37 which extends into a recess 40 in the casing 30 and is encircled by a spring 41 acting against the casing 30 and on the diaphragm 34 at the pressure sealing plate 38. A passage 42 in section 31 connects chamber 35 to the brake pipe 2 by way of pipe 29, for providing fluid in said chamber at the pressure acting in the brake pipe on the locomotive. A passage 44 connects chamber 36 to the feed valve device 4 by way of pipe 11 and provides fluid in chamber 36 at the pressure delivered by said feed valve device. The plunger 37 extends through chamber 36 and a bore 43 in a wall separating chamber 36 from a chamber 46 in the casing section 33. A sealing ring 45 encircling and carried by the plunger 37 has sliding contact with the wall of bore 43 for preventing leakage of fluid from chamber 36 through the bore 43. The lower end of the plunger 37 is disposed in chamber 46 in contact with a pressure responsive rheostat 47 which is disposed in a guide sleeve 49. The pressure responsive rheostat 47 is of such design that the electrical resistance of said rheostat increases as pressure of the plunger 37 acting on said rheostat decreases, and conversely, the electrical resistance of said rheostat decreases as the pressure of the plunger 37 acting on said rheostat increases. An adjusting screw 50 is provided in a tap hole 51 of the casing 30 to adjust the pressure applied by spring 41 to the rheostat 47. Two openings 52 and 53 are provided in the section 33 of the casing 30 for the purpose of venting chamber 46 to atmosphere and to provide lead-in openings for wires 67 and 78, which are attached to opposite ends of the rheostat 47 and connected in the Wheatstone bridge circuit to be now described. Referring to Fig. 2, the Wheatstone bridge circuit associated with the brake equipment comprises a power supply such as a battery 54 which is adapted to be connected by a switch 55 to a supply wire 56 and a return wire 57. A first arm of the Wheatstone bridge consists of a wire 58, a variable resistor 59, and a wire 60, a second arm consists of a wire 61, a resistor 62, and a wire 63, a third arm consists of a wire 64, a variable resistor 65 and a wire 66, and a fourth arm consists of the wire 67, the pressure responsive rheostat 47 of the measuring device 5, and the wire 68. The first arm of the bridge arrangement is connected to the fourth arm at a junction 69, and the second arm is connected to the third arm at a junction 70. The first and second arms are connected together at the supply junction 71 and the third and fourth arms are connected together at the return junction 72 which is connected to the return wire 57.

Interposed between the supply wire 56 and the supply junction 71 is a variable resistor 73 having a movable contact arm 74 for adjusting the voltage delivered to the bridge arrangement. In order to effect a balanced condition in the bridge arrangement, the resistor 59 of the first arm will be adjusted to have a resistance value equal to the value of resistor 62 in the second arm, and the value of resistor 65 in the third arm will be adjusted to have a value equal to the resistance of the pressure responsive rheostat 47 in the fourth arm when there is no fluid pressure leakage in the train, as will be hereinafter described.

Connected across the bridge arrangement between the junctions 69 and 70 is an electric meter 75 of the milliammeter type which registers zero current when the bridge is balanced and registers current flow when the bridge is unbalanced, the amount of current flow varying directly with the degree of unbalance of the bridge arrangement. Connected in series with the meter 75 is a relay circuit consisting of a relay 76 having a contact member 77 and a parallel adjusting resistor 78. Resistor 78 is adjusted so that the relay 76 will cause its contact member 77 to pick up at a predetermined current flow across the bridge arrangement when the bridge is unbalanced. This circuit across the bridge arrangement includes wire 79, meter 75, wire 80, the relay circuit consisting of relay 76 and resistor 78 and wire 81. When the contact member 77 of relay 76 is picked-up, a circuit is completed from the supply wire 56 to the return wire 57 by way of any suitable warning device such as a bell, buzzer, or as shown in the drawing, a lamp 82, for thereby energizing said lamp.

*Operation Figs. 1 and 2*

With the brake valve device 3 in running position and the main reservoir 1 charged with fluid under pressure, it will be assumed that there are no leaks in the brake pipe 2 or any of the brake equipment throughout the train, and that the equipment is fully charged with fluid under pressure at the value regulated by the feed valve device 4. This assumption of no leakage at all will result in a condition where there is no flow of fluid under pressure to the brake pipe 2 after said pipe is once fully charged, and there will be no flow of fluid under pressure from the feed valve device 4 to the pipes 10 and 11. Thus, the brake pipe 2, the pipe 29, passage 42 in the measuring device 5, and the chamber 35 will be charged with fluid under pressure at the value predetermined by the adjustment of the feed valve device 4. Likewise, the pipes 10 and 11, the passage 44 of the measuring device 5, and the chamber 36 will be charged with fluid under pressure at the value predetermined by the adjustment of the feed valve 4. There being no flow of fluid under pressure from the feed valve device 4, to the brake pipe under this assumed leak tight condition, the pressure of fluid in chamber 36 of the measuring device 5 will be equal to the pressure of the fluid in chamber 35 of the measuring device 5.

With substantially equal pressures in the two chambers 35 and 36 the spring 41 exerts a downward force on the diaphragm 34 and thereby on the pressure responsive rheostat 47 through the medium of the plunger 37. This force, henceforth called the normal pressure, is regulated by adjustment of the adjusting screw 50 to give (under the assumed condition) a desired electrical resistance value of the pressure responsive rheostat 47 for an initial setting that will cause an indication of no brake pipe leakage. This said desired resistance is such that the Wheatstone bridge, in which the rheostat 47 is included, is in a balanced condition and meter 75 registers a zero reading.

Now assume that there is a slight amount of leakage of fluid under pressure from the brake pipe 2 and brake equipment throughout the train. With this condition existing, the pressure of fluid in the brake pipe 2 throughout the train will decrease slightly and thus the pressure of fluid in pipe 29 and chamber 35 of the measuring device 5 will also decrease correspondingly. Also with the decrease in pressure of fluid in the brake pipe 2 and a resulting decrease of fluid pressure in the regulating pipe 4a, the feed valve device 4 will operate as explained in the above mentioned Patent 2,424,480 to increase the pressure of fluid in pipe 10 and thus chamber 36, in accordance with the degree of leakage in said brake pipe. Hence with this decrease in pressure of fluid in chamber 35, and the increase in pressure of fluid in chamber 36, the greater pressure of fluid in chamber 36 will cause the diaphragm 34 and the plunger 37 to be moved upward, thus decreasing the pressure exerted on pressure responsive rheostat 47, which increases the resistance of said rheostat.

It should be noted, that with the occurrence of leakage in the brake pipe, the restricted passage 27 in the brake valve device 3 will offer restriction to the flow of fluid under pressure from the feed valve device 4 through pipes 10, 11 and passages 17, 18 to the brake pipe to replace such leakage, as a result of which, the pressure of fluid in said pipes 10, 11 will build up and exceed to a noticeable extent the pressure of fluid in the brake pipe 2 and the pipe 29 on the locomotive. It has been found, that the pressure of fluid provided in the pipes 10, 11 by operation of the feed valve device 4 in response to the pressure in regulating pipe 4a, will vary directly in proportion to the amount of fluid under pressure required for maintaining the pressure of fluid in a brake system of a train against leakage. Advantage is taken of this characteristic for controlling operation of the measuring device 5 to effect an indication of the leakage condition of the brake systems, in a manner which will now be described.

As the feed valve device 4 supplies fluid under pressure from the main reservoir 1 to the brake pipe 2 and pipe 29 by way of pipe 10, passages 16, 17, 18, restricted passage 27, and passages 25, 23, 22, and 21, at a rate corresponding to the rate of leakage of fluid under pressure from the brake pipe 2, pipe 4a, and the brake system throughout the train; the movable diaphragm 34 and associated plunger 37 of measuring device 5 will assume a position corresponding to said rate of leakage of fluid under pressure and thus cause a change in the resistance of the pressure responsive rheostat 47 corresponding to said leakage.

The measuring device 5 controls the Wheatstone bridge and indicating circuits shown in Fig. 5 as follows:

With the switch 55 closed, a circuit is completed from the battery 54 by way of the supply wire 56, variable resistor 73, and contact arm 74 which has previously been adjusted to limit the voltage to the bridge arrangement to a predetermined value, to the junction 71 of the first and second arms of the bridge arrangement. This circuit is continued across the first and fourth arms of the bridge arrangement in parallel with the second and third arms of said bridge arrangement to the junction 72 and thence by way of return wire 57 to the negative side of the battery 54.

With the bridge arrangement balanced as above explained, according to the theory of the Wheatstone bridge, there will be no current flow across the meter 75 or the resistor 78 and relay 76 between the junctions 69 and 70 when there is no leakage of fluid under pressure from the brake pipe 2, thus the relay 76 will be de-energized with its contact member 77 dropped-out.

However, with leakage of fluid under pressure from the brake equipment, the measuring device 5 will operate as above explained to cause the resistance of the pressure responsive rheostat 47 to be increased in proportion to the degree of such leakage. This increase in resistance of rheostat 47, which is in the fourth arm of the previously balanced bridge arrangement, will cause the bridge arrangement to become unbalanced to a degree proportional to the brake pipe leakage and thus, according to theory of the Wheatstone bridge, a corresponding flow of current will occur across the meter 75 and the parallel resistor 78 and relay 76 between the junctions 69 and 70, and cause a corresponding indication to occur in the meter 75 such as by a deflection of a needle (not shown). If the degree of leakage becomes dangerous, as in case of parting of a train, then by operation of the measuring device 5 this flow of current across meter 75 will cause the relay 76 to become energized to its picked-up position wherein the contact member 77 of said relay is closed. With the contact member 77 closed, a circuit is completed from the battery supply wire 56 via closed contact 77 to the warning lamp 82 and thus to the battery return wire 57, thus energizing lamp 82.

It can thus be seen that if a leak is present or develops in a brake equipment while the train is running, the measuring device 5 and its accompanying electrical circuits will operate to effect operation of two indicating means, namely, the meter 75 normally and the lamp 82 in case of a dangerous leakage condition so that the engineer may be aware of such leakage.

It must be noted here that on short trains a small amount of leakage on each car will require a small amount of fluid under pressure to be delivered to the brake pipe from the feed valve device 4 to offset such leakage, whereas on longer trains a like amount of leakage on each car will require a much larger amount of fluid under pressure to be delivered to the brake pipe from the feed valve device 4 to offset the leakage. Because of the difference in the amount of fluid under pressure thus delivered to offset leakage in trains of different lengths, the difference between the pressures of fluid in chamber 35 of the measuring device 5 and the pressure of fluid in chamber 36 will be greater on long trains than on short trains, which would cause the resistance of the rheostat 47 to be greater on long trains than on short trains for the same amount of leakage per car. As was previously explained, this would cause a greater unbalance of the bridge arrangement on long trains than on short trains which would appear on the meter 75 as a greater leakage whereas it is actually not. To compensate for this, the variable resistor 73 is adjustable according to different train lengths to regulate the current to said bridge and thus regulate the current through the meter 75 when the bridge arrangement is unbalanced whereby the adjustment of the meter 75 for any given degree of leakage will be the same for all lengths of trains.

Description Fig. 3

Fig. 3 of the drawings shows an alternate measuring device 5a differing from the measuring device 5 in that instead of the pressure responsive rheostat 47 of the latter, a system of levers and a common rheostat 47a are employed to accomplish the same end. This device 5a employs a guide pin 83 in the diaphragm plunger 37a disposed to move in a guide slot 84 in one arm of a lever 85 which intermediate its ends is mounted on a fixed pivot 85a. The end of the lever 85 opposite the guide slot 84 is connected by a pin 86 to one end of an adjusting link 87, the opposite end of which is connected by a pin 88 to one end of a contact lever arm 89 which is in contact at the opposite end with a rheostat 47a. The contact lever arm 89 is pivotally mounted between its ends on a stationary insulated mounting block 90. The contact lever arm 89 is electrically insulated from the link 87. Connected to the contact lever arm 89 is one of the lead wires 67 or 68, the other being connected to one end of the rheostat 47a. The contact lever arm 89 from the point of connection to wires 67 to the point of contact with the rheostat 47a is adapted to conduct current such that a circuit may be completed from the wire 67 to the wire 68 by way of the contact lever arm 89 and the portion of the rheostat 47a in use. Therefore movement of the diaphragm plunger 37a up or down will result in adjusting contact lever arm 89 relative to the rheostat 47a to vary the amount of resistance of the rheostat 47a in the Wheatstone bridge with the same result as the varying of pressure had on the pressure responsive rheostat 47 of the measuring device 5. A turn-buckle arrangement 91 is provided in the link 87 to serve the same purpose as the adjusting screw 50 serves in the measuring device 5. Therefore, either the measuring device 5 or 5a or a similar device may be used in the Wheatstone bridge arrangement to accomplish the same end.

Summary

It will now be seen that I have provided an apparatus for measuring the rate of flow of fluid in a passage or pipe, and a novel means of indicating said rate or any change in said rate. The apparatus includes a measuring device that operates on a pressure differential between the fluid supplied to, and the fluid in, the train brake pipe, and includes a novel means for employing a Wheatstone bridge arrangement for electrically indicating the rate of flow of fluid to said pipe and causing visual and/or audible signals to actuate when the rate of flow of said fluid is excessive.

Having now described my invention, what I claim as new and desire to secure by Letters Patent, is:

1. In combination, a conduit having a fluid flow restriction therein, adjustable valve means operative automatically to regulate admittance of fluid to said conduit at the input side of said flow restriction to maintain a certain selected pressure of fluid in said conduit at the output side of said restriction substantially constant during variable rates of flow of fluid therefrom, pressure responsive means arranged to establish a variable electrical characteristic corresponding to the variable pressures in said conduit at said one side of said restriction, and electro-responsive means for transforming said variable electrical characteristic into a corresponding variable sensible characteristic for indicating variable rates of flow of fluid from said valve means through said conduit.

2. The combination as set forth in claim 1, including means responsive to pressure in said conduit at said output side of said restriction and cooperable with said pressure responsive means to alter the relationship between the variable pressures in said conduit at said input side of said restriction and the corresponding electrical characteristic established by said pressure responsive means, thereby to maintain accord between the rates of flow indicated by said variable sensible characteristic and the variable pressures in said conduit at said input side of said restriction at different selected values of pressure maintained substantially constant in said conduit at said output side of said restriction.

JAMES G. REES.

References Cited in the file of this patent

UNITED STATES PATENTS

| Number | Name | Date |
|---|---|---|
| 880,273 | Bristol | Feb. 25, 1908 |
| 1,007,178 | Billings | Oct. 31, 1911 |
| 1,120,214 | Metzdorff | Dec. 8, 1914 |
| 1,156,635 | Sheperdson | Oct. 12, 1915 |
| 2,219,391 | Jacobson | Oct. 29, 1940 |
| 2,254,905 | Mullan | Sept. 2, 1941 |
| 2,321,631 | Sibal | June 15, 1943 |
| 2,468,768 | Malick | May 3, 1949 |